United States Patent [19]

Harada

[11] Patent Number: 4,970,442
[45] Date of Patent: Nov. 13, 1990

[54] CORRECTION CIRCUIT USED IN HORIZONTAL DEFLECTION CIRCUIT FOR THE CORRECTION OF IMAGE DISTORTION

[75] Inventor: Naohiko Harada, Nishinasumomachi, Japan

[73] Assignee: Kabushiki Kaisha Toshiba, Kawasaki, Japan

[21] Appl. No.: 482,519

[22] Filed: Feb. 21, 1990

[30] Foreign Application Priority Data

Feb. 21, 1989 [JP] Japan ................................. 1-40538

[51] Int. Cl.$^5$ ......................... H01J 29/70; H04N 3/32
[52] U.S. Cl. ....................................... 315/367; 358/137
[58] Field of Search ................. 315/367, 364; 358/137

[56] References Cited
U.S. PATENT DOCUMENTS 4,019,093  4/1977  Klein ................................... 315/370
4,171,504  10/1979  Strathman ........................... 315/367
4,468,593  8/1984  Haferl .................................. 315/371
4,516,058  5/1985  Haferl .................................. 315/370
4,612,481  9/1986  Storberg .............................. 315/370
4,872,060  10/1984  Micic et al. ......................... 315/371

Primary Examiner—Gregory C. Issing
Attorney, Agent, or Firm—Cushman, Darby & Cushman

[57] ABSTRACT

A correction circuit is used with a horizontal deflection circuit, for the correction of an image distortion. The correction circuit comprises a line memory for sequentially fetching and storing one-field digital image data. The digital image data read out of the line memory is supplied to a D/A conversion circuit. This D/A conversion circuit converts the digital image data into an analog signal used for making a beam scan rate constant on the entire screen of a CRT. The data transfer rate used in both the line memory and the D/A conversion circuit is varied, with a clock supply rate adjusted by a frequency modulation circuit and an A/D conversion circuit on the basis of clock rate data.

4 Claims, 4 Drawing Sheets

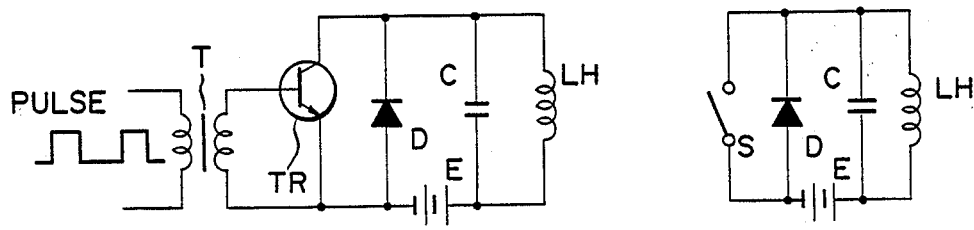
FIG. 1 (PRIOR ART)
FIG. 2 (PRIOR ART)
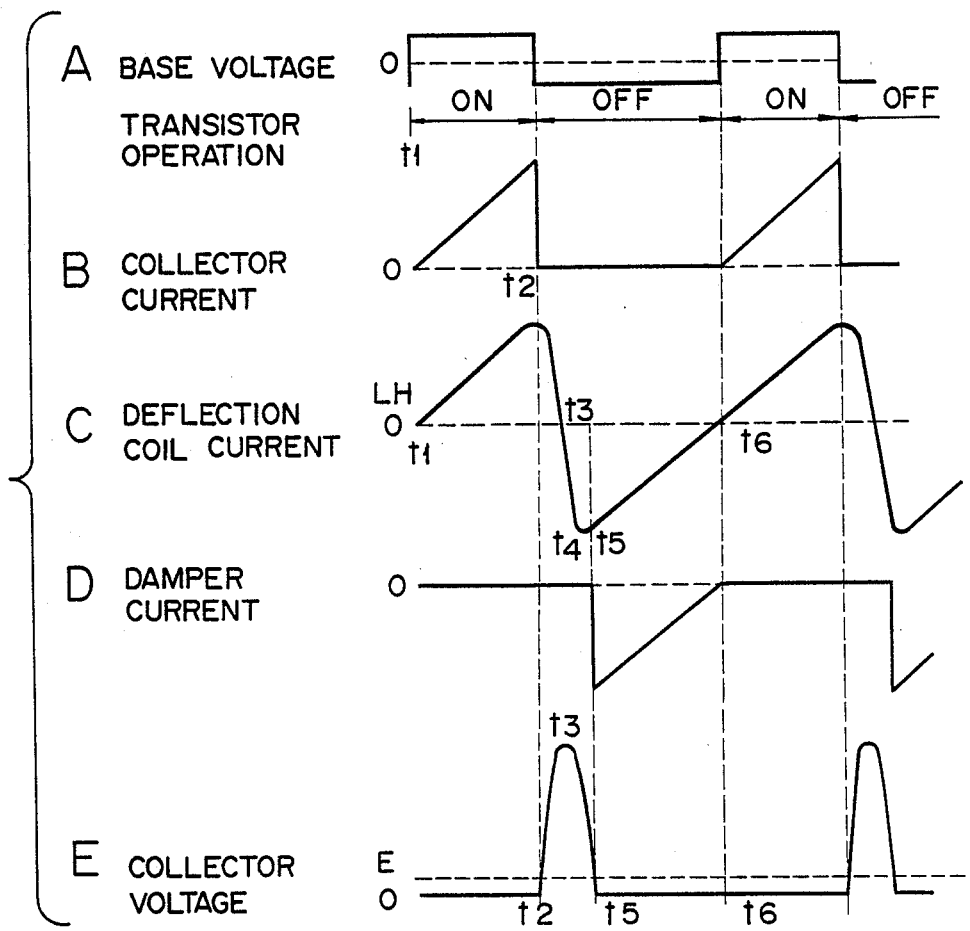
FIG. 3

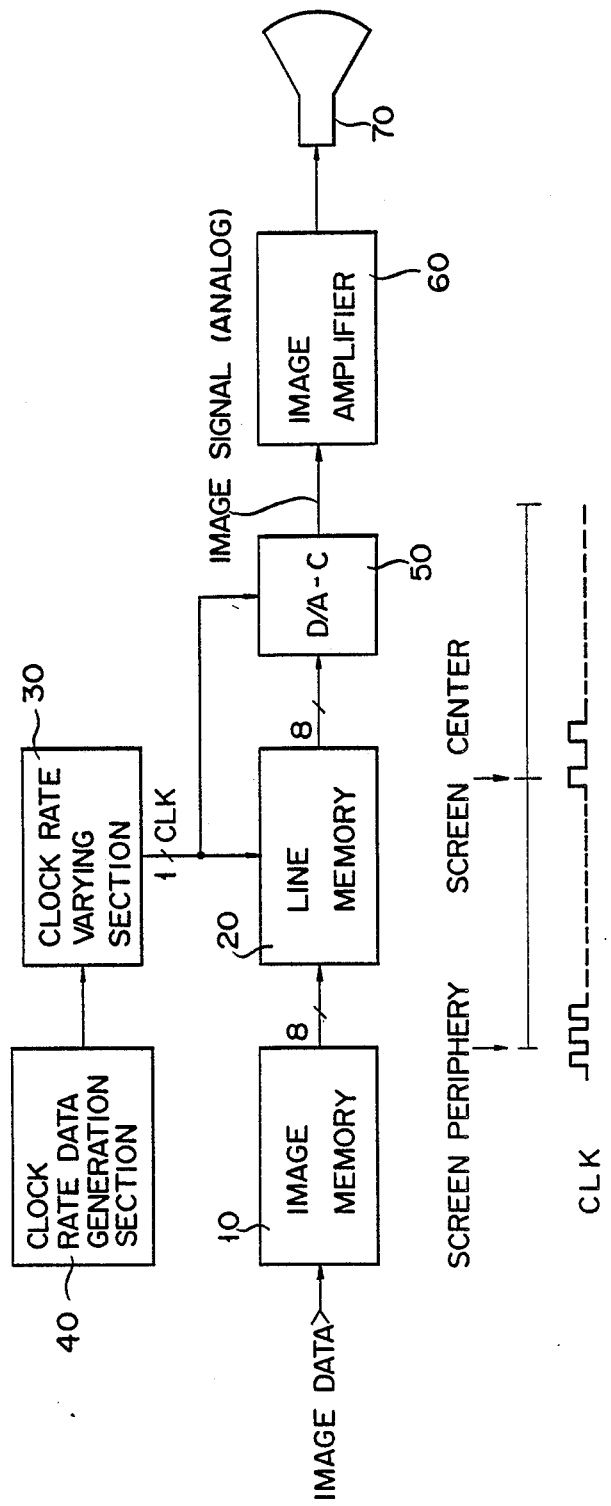
F I G. 7

CORRECTION CIRCUIT USED IN HORIZONTAL DEFLECTION CIRCUIT FOR THE CORRECTION OF IMAGE DISTORTION

BACKGROUND OF THE INVENTION

1. Field of the Invention

The present invention relates to a correction circuit which is used in a horizontal deflection circuit, so as to to correct a distortion of an image displayed on the screen of a cathode ray tube.

2. Description of the Related Art

In the prior art, a horizontal deflection beam is emitted toward the display screen of an image display device, such as a CRT monitor, by supplying a current through the horizontal deflection coil of cathode ray tube.

An example of a manner in which the current flowing through the horizontal deflection coil is controlled will be described, with reference to FIGS. 1, 2 and 3A–3E.

FIG. 1 is a circuit diagram of the basic circuit of a conventional horizontal deflection circuit, and FIG. 2 is an equivalent circuit corresponding to the circuit shown in FIG. 1.

As is shown in FIGS. 1 and 2, the conventional horizontal deflection circuit is made up of a fixedvoltage source E, a horizontal deflection coil LH, a tuning capacitor C, a booster transformer TR, a switching transistor TR, and a damper diode D. The transistor TR is applied with a pulse between the base and emitter thereof, and serves as a switch S. When the switch S is open, as viewed in the equivalent circuit shown in FIG. 2, the diode D passes a current only in the reverse direction, so that no current flows through the circuit.

When the switch S is closed at time t1 shown in FIG. 3A, a current whose intensity linearly increases with time flows through the deflection coil LH. At the time, the capacitor C is charged instantly. When the switch S is opened at time t2, the current flowing through the deflection coil LH decreases while simultaneously charging the capacitor C, and becomes zero at time t3. Thereafter, electricity is discharged from the capacitor C to the deflection coil LH, and a current flowing in the reverse direction to that mentioned above passes through the deflection coil LH from time t3 to time t4.

Next, in the tuning circuit made up of the deflection coil LH and the capacitor C, the capacitor C begins to be charged in the reverse direction to that mentioned above. Due to the existence of the damper diode D, however, the voltage appearing at the terminal of the deflection coil LH becomes higher than the power source voltage at time t5, which is immediately after the the time when the maximum current flows through th deflection coil LH. Since, therefore, the diode D is applied with voltage in the forward direction, the current which has flowed through the deflection coil LH also flows through the diode D, while simultaneously charging the power source, and gradually decreases. When the current flowing through the deflection coil LH becomes zero, the switch S is closed again at time t6. With the above operation repeated, the sawtooth current I shown in FIG. 4A is made to flow through the deflection coil LH.

As is shown in FIG. 5, a horizontal deflection beam BM is emitted from a predetermined point inside a cathode ray tube B toward the screen of the tube B by causing the sawtooth current I to flow through the horizontal deflection coil LH. If the sawtooth current I flowing through the horizontal deflection coil LH is not corrected, the deflection angle $\theta$ per unit time of the horizontal deflection beam BM is proportional to the intensity of the sawtooth current I. Accordingly, the deflection angle $\theta$ per unit time is constant with respect to the entire screen. This means that the distance for which the screen is scanned with the beam per unit time varies, depending upon the portions of the screen. If it is assumed that the scanning distance in the center of the screen is l 1 and that the scanning distance in a peripheral portion of the screen is l 2, then the relation below is established, as is shown in FIG. 5, $$l2 > l1$$

As a result of this relation, the image displayed on the cathode ray tube B is horizontally elongated in the periphery of the screen.

This problem has been conventionally solved by adding a correction circuit 2 to a horizontal deflection circuit 1, as is shown in FIG. 6. More specifically, the resonance current (FIG. 4B) produced by the horizontal deflection coil LH and capacitor C of the horizontal deflection circuit 1 is superposed on the sawtooth current I, to obtain a corrected horizontal deflection current ILH having such an "S"-shaped waveform as is shown in FIG. 4C. This corrected horizontal deflection current ILH is made to flow through the horizontal deflection coil LH, in order that scanning distance l 2 becomes equal to scanning distance l 1, for the improvement of the linearity. However, since the resonance current I is dependent on both the inductance of the horizontal deflection coil LH and the capacitance of the capacitor C, it is impossible to minutely control he resonance current I. When the corrected current ILH shown in FIG. 4C is made to flow through the horizontal deflection coil LH, the scanning rate may still be low in the center of the screen and high in the periphery of the screen. Therefore, an image on the screen may remain distorted to a certain extent.

As mentioned above, even with the use of the conventional horizontal deflection circuit, the spatial linearity is not good and cannot be improved satisfactorily when the screen is scanned with the beam in the horizontal direction. This problem is due to the reason that analog control cannot be performed with respect to the horizontal deflection current ILH, as may be understood from the following prior art publications:

U.S. Pat. No. 4,019,093;
U.S. Pat. No. 4,612,481;
U.S. Pat. No. 4,516,058; and
U.S. Pat. No. 4,468,593.

SUMMARY OF THE INVENTION

The present invention has been developed in consideration of the above circumstances, and its object is to provide a practical correction circuit used with a horizontal deflection circuit for the correction of an image distortion, which correction circuit does not control the horizontal deflection current flowing through the horizontal deflection coil but digitally controls image data, for the minute correction of the horizontal linearity, and which does not cause power loss in spite of the correction.

To achieve this object, the present invention provides a correction circuit which comprises: memory means for sequentially fetching and storing one-field digital image data; D/A conversion means, supplied with the one-field digital image data from the memory means, for converting the digital image data into an analog signal used for making the beam scan rate constant on the entire screen of a cathode ray tube; adjusting means, connected to both the memory means and the D/A conversion means, for adjusting a clock supply rate, so as to make image data transfer rate variable in both the memory means and the D/A conversion means; and clock rate data-generation means for generating clock rate data which is supplied through the adjusting means to both the memory means and the D/A conversion means.

With the above construction, the correction circuit of the present invention can digitally and minutely correct the horizontal linearity on the screen of the cathode ray tube by controlling the image data transfer rate by use of a variable digital clock and with no need to alter the circuit design of the horizontal deflection circuit (i.e., with no need to control the deflection current flowing through the deflection coil). Moreover, the correction circuit does not cause power loss as a result of the correction, and is therefore practical in actual use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a circuit diagram showing an example of a prior art horizontal deflection circuit;

FIG. 2 is an equivalent circuit diagram corresponding to the circuit diagram shown in FIG. 1;

FIGS. 3A-3E are waveform charts of signals at several points in the circuit shown in FIG. 2;

FIG. 7 is a schematic block circuit diagram showing a correction circuit according to an embodiment of the present invention, the correction circuit being used for a horizontal deflection circuit, for the correction of an image distortion.

DETAILED DESCRIPTION OF THE PREFERRED EMBODIMENTS

Figure 4:
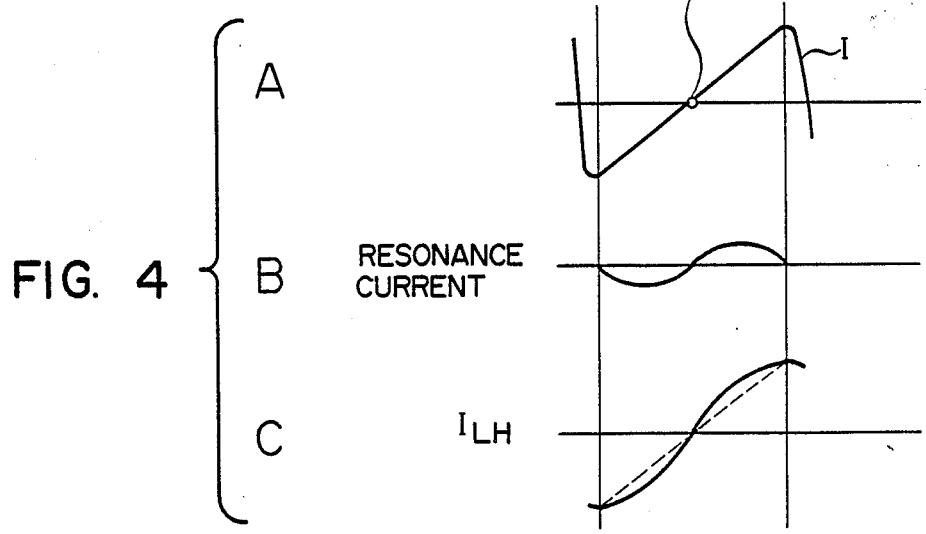
FIGS. 4A-4C are waveform charts regarding the circuit shown in FIG. 2, FIG. 4A showing an uncorrected horizontal deflection current, FIG. 4B showing a resonance circuit, and FIG. 4C showing a corrected horizontal deflection current.
Figure 5:
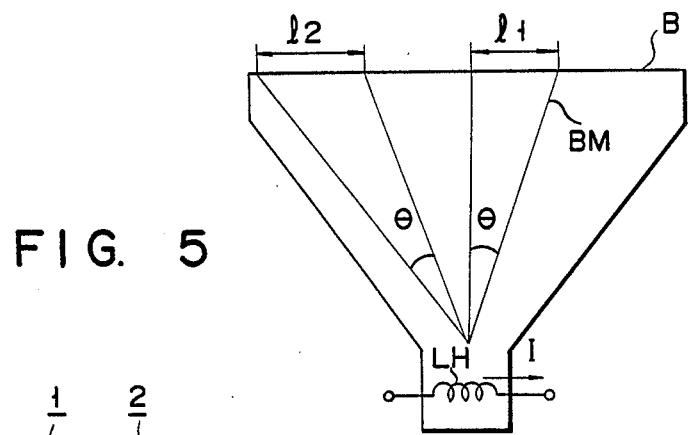
FIG. 5 is an explanatory view showing how the screen of a cathode ray tube is scanned by use of the prior art horizontal deflection circuit.
Figure 6:
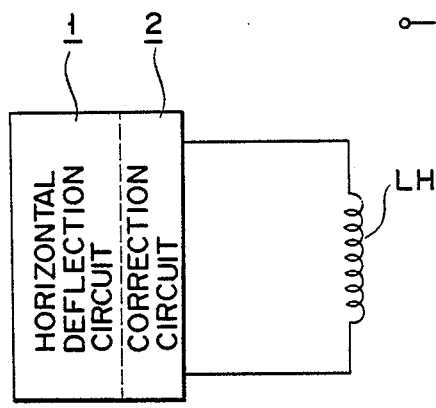
FIG. 6 is a view showing an example of a prior art circuit arrangement.

A correction circuit according to an embodiment of the present invention will now be described, with reference to the accompanying drawings.

FIG. 7 is a schematic block circuit diagram showing the correction circuit of the embodiment. Normally, the correction circuit is made up of the following structural components: an image memory 10 for storing image data supplied from a horizontal deflection circuit (not shown); a line memory 20 for fetching one-field data from the image memory 10 and storing the one-field data; a clock rate-varying section 30 for supplying the line memory 20 with rate data (i.e., data on write and read rates); a clock rate data-generation section 40 for providing the clock rate-varying section 30 with clock rate data; a D/A converter 50, supplied with the one-field data read from the line memory 20 at a transfer rate corresponding to the rate data, for converting the supplied one-field data into an analog signal; an image amplifier 60 for amplifying an output of the D/A converter 50; and a cathode ray tube (CRT) 70 whose horizontal deflection is controlled on the basis of an output of the image amplifier 60.

Figure 8:
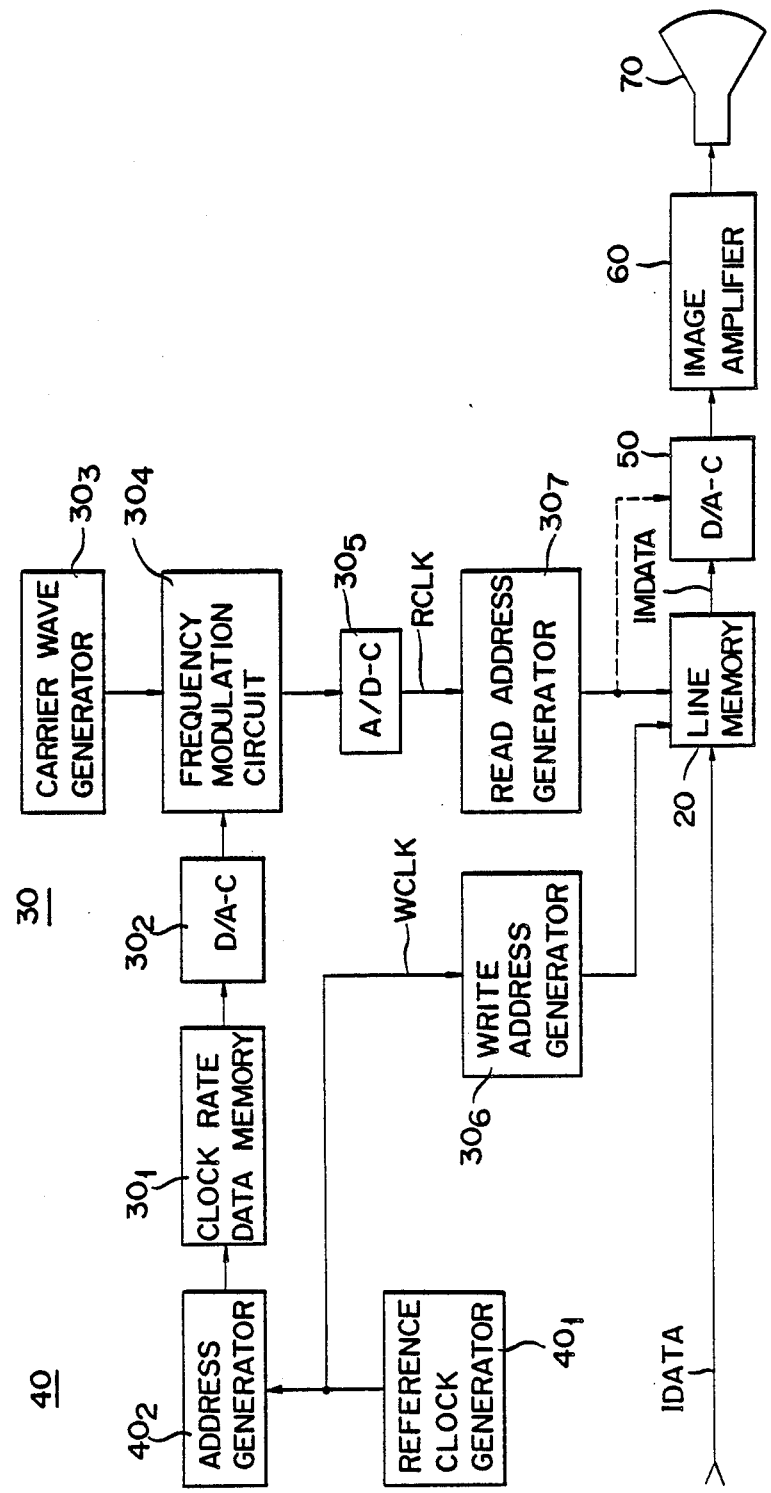
FIG. 8 is a block circuit diagram showing a specific circuit arrangement of the circuit shown in FIG. 7.

FIG. 8 shows a specific circuit arrangement of the circuit shown in FIG. 7. Referring to FIG. 8, a basic clock generator 401 and an address generator $40_2$ jointly constitute the clock rate data-generation section 40 mentioned above, and a clock rate memory $30_1$, a D/A converter $30_2$, a carrier wave generator $30_3$, a frequency modulation circuit $30_4$, an A/D converter $30_5$, a write address generator $30_6$, and a read address generator $30_7$ jointly constitute the clock rate-varying section 30 mentioned above.

In the descriptions below, a monitor having a matrix of 1,000×1,000 pixels will be taken by way of example. The data corresponding to one horizontal period is input through a signal line IDATA as digital values, and is stored in the line memory 20 pixel by pixel at the timing determined by the write address generator $30_6$. The line memory 20 has a double-buffer structure. The data is read out of the line memory 20 at the timing determined by the read address generator $30_7$. The read address generator $30_7$ reads digital signals RCLK output from the A/D converter $30_5$ pixel by pixel, and generates a read address. The digital signals RCLK determine a read rate such that the images horizontally displayed on the screen have a constant length in the entire screen.

The rate data which the digital signals RCLK require for making this correction is stored in the clock rate data memory $30_1$, on the basis of the position of a horizontal beam. The rate data is read out of the clock rate data memory $30_1$ by use of an output of the address generator $40_2$. The read data read out of the data rate memory $30_1$ is converted into an analog value by the D/A converter $30_2$, and is supplied to the frequency modulation circuit $30_4$ as a modulation signal. The carrier wave (the maximum frequency of which is 100 MHz) generated by the carrier wave generator $30_3$ corresponds to a reference rate used for one pixel. The carrier wave is subjected to frequency modulation such that its frequency is within the range of approximately 100±10 MHz. This frequency-modulated carrier wave is converted into digital signals RCLK, for the determination of the timing at which data is read out of the line memory 20. Data±MDATA, the read rate of which is corrected on the basis of the one horizontal period, is converted into an image signal by the D/A converter 50. Then, it passes through the image amplifier 60 and is output to the screen of the CRT 70.

As mentioned above, the circuit design of the horizontal deflection circuit is not changed in the embodiment. Instead, digital data is supplied to the CRT 70 by the clock rate-varying section 30 and the clock rate data-generation section 40. Therefore, the horizontal linearity can be corrected digitally and minutely by providing the screen center with a low-rate clock and providing the screen periphery with a high-rate clock, as is shown in FIG. 7. Moreover, the embodiment causes no power loss in spite of the correction and is thus very practical in use.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A correction circuit used with a horizontal deflection circuit for the correction of an image distortion, comprising:
    memory means for sequentially fetching and storing one-field digital image data;
    D/A conversion means, supplied with the one-field digital image data from the memory means, for converting the digital image data into an analog signal used for making the beam scan rate constant on a screen of a cathode ray tube;
    adjusting means, connected to both the memory means and the D/A conversion means, for adjusting a clock supply rate, so as to make image data transfer rate variable in both the memory means and the D/A conversion means; and
    clock rate data-generation means for generating clock rate data which is supplied through the adjusting means to both the memory means and the D/A conversion means.

2. A correction circuit according to claim 1, wherein said memory means includes a line memory for storing the digital image data.

3. A correction circuit according to claim 1, wherein said adjusting means includes:
    frequency modulation means, supplied with the clock rate data, for modulating the frequency of a carrier wave signal generated by a carrier wave generator; and
    A/D conversion means for converting the carrier wave signal, whose frequency is modulated by the frequency modulating means, into a digital signal and for supplying the digital signal to the memory means.

4. A correction circuit according to claim 1, wherein said clock rate data-generation means includes:
    a reference clock generator; and
    an address signal generator, supplied with a clock by the reference clock generator, for generating an address signal to be stored in a clock rate data memory.

* * * * *